L. T. PYOTT.

Assignor by mesne assignments to M. Pennypacker.

SCREW HOISTING PULLEY APPARATUS.

Reissued April 17, 1877.

No. 7,611.

WITNESSES

Chas J. Gooch

A. Blond Burdett

INVENTOR

Louis T. Pyott

By Knight Bros Attorneys

N. PETERS, PHOTO-LITHOGRAPHER, WASHINGTON, D. C.

UNITED STATES PATENT OFFICE.

LOUIS T. PYOTT, OF PHILADELPHIA, PENNSYLVANIA, ASSIGNOR, BY MESNE ASSIGNMENTS, TO MATTHIAS PENNYPACKER, OF SAME PLACE.

IMPROVEMENT IN SCREW HOISTING-PULLEY APPARATUS.

Specification forming part of Letters Patent No. 171,855, dated January 4, 1876; reissue No. 7,611, dated April 17, 1877; application filed March 20, 1877.

*To all whom it may concern:*

Be it known that I, LOUIS T. PYOTT, of Philadelphia, in the State of Pennsylvania, have invented certain new and useful Improvements in Screw Hoisting-Pulley Apparatus, of which the following is a specification:

My invention relates to a screw hoisting-machine, which may be used as a traversing-hoist when suspended by wheels on a rail or beam, or may be used as a lift at any desired point when detached from the traversing-truck. The operating-screw and worm-wheel are inclosed in a tight case. The hoisting-chains pass over sheaves fastened by clutch-connections to each face of the projecting hub of the worm-wheel. The clutch-connections avoid the transmission of any torsional strain through a shaft. The location of the sheaves on opposite sides of the wheel equalizes the load on the bearings, preventing lateral or indirect strains, and greatly increases the durability and strength of the apparatus.

The box is secured to the worm-wheel hub by means of collars which fit over gudgeons formed on the box.

Figure 1:
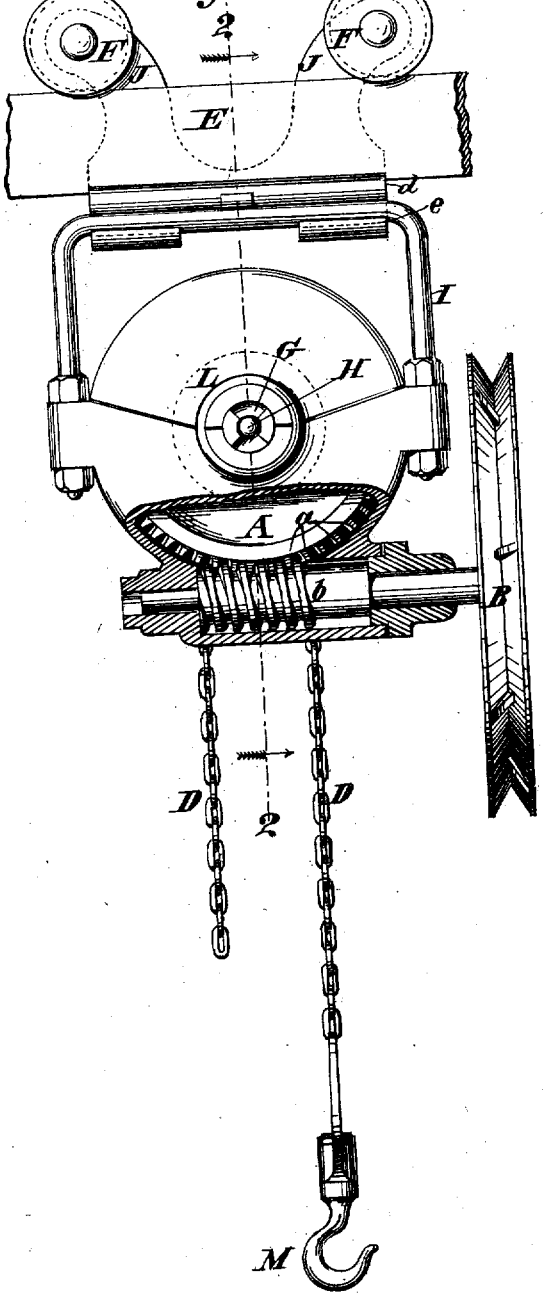
Figure 2:
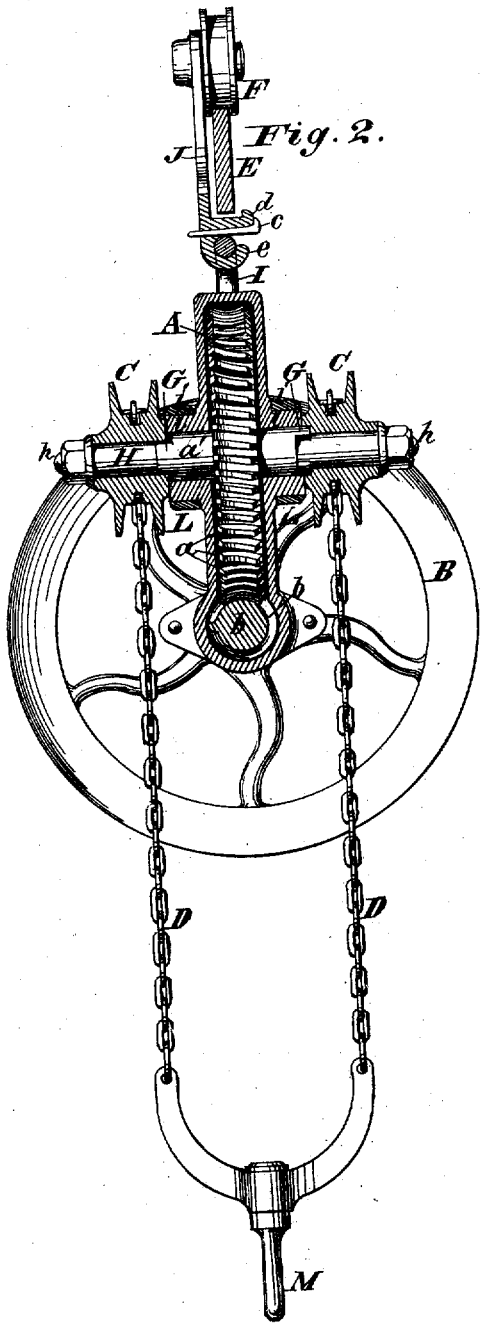

In the accompanying drawings, Figure 1 is a side elevation of my improved hoisting-machine, partly in section. Fig. 2 is a vertical section of the same on the line 2 2, Fig. 1.

A represents a worm-wheel having its bearings in a central box, L. B is a driving-wheel, the shaft of which is formed with a worm or screw, *b*, meshing with the worm-teeth *a'* of the wheel A, so as to impart a powerful rotary movement thereto, and retain it in any position in which it may rest.

C C are chain wheels or sheaves located on either side of the central box L, and connected rigidly to the hub *a'* of the worm-wheel A by means of clutches G G, bolt H, and suitable fastenings *h*.

D represents the hoisting-chain, which may be endless or otherwise, as preferred. The load is carried by a hook, M. The machine may be suspended from a truck, J, having grooved wheels F and traveling on a rail, E, so as to be moved at will from place to place either with or without a load. I represents a yoke, which is firmly secured at its ends, by nuts, to projections on the box L of wheel A.

The box L is secured to the worm-wheel A by means of collars *l'*, which fit over gudgeons *l* formed on the box and surrounding the hub *a'* of the worm-wheel. When the collars are removed the upper section of the box L can be raised.

The truck J is formed with a grooved flange, *d*, on one side. This flange is adapted to keep the truck in proper position on the rail from the lower side. The bottom plate of the truck is turned up so as to form grooves *e* for the yoke I to rest in. A wedge or pin, *c*, is inserted beneath the flange so as to prevent the displacement of the yoke I.

The screw and worm-wheel, being in a tight box, are kept free from dirt.

Having thus described my invention, the following is what I claim as new and desire to secure by Letters Patent:

1. A screw hoisting-pulley apparatus, constructed with sheaves C C of same diameter, located on opposite sides of the central box inclosing the worm-wheel, in combination with a double chain, D, as and for the purpose set forth.

2. A screw hoisting-pulley apparatus, having a central box, L, forming bearings for the worm-wheel, as and for the purpose set forth.

3. A hoisting-machine, constructed with a central worm-wheel, inclosed in a tight case or box, and with sheaves C C projecting on both sides of the said case or box for receiving the hoisting-chains, substantially as described.

4. The combination of a worm-wheel, A, and sheaves C C, provided with clutch-connections G G, and secured together by a bolt, H, as and for the purpose set forth.

5. The box L, constructed with gudgeons *l l*, and secured to the worm-wheel A by collars *l' l'*, all combined and arranged as and for the purpose set forth.

LOUIS T. PYOTT.

Witnesses:
J. R. MASSEY,
JACOB RAYMOND.